United States Patent [19]

Miyake

[11] Patent Number: 4,729,040
[45] Date of Patent: Mar. 1, 1988

[54] TRACKING APPARATUS FOR PLAYING BACK ROTARY MAGNETIC RECORDING MEDIUM

[75] Inventor: Izumi Miyake, Kaisei, Japan

[73] Assignee: Fuji Photo Film Co., Ltd., Kanagawa, Japan

[21] Appl. No.: 750,258

[22] Filed: Jul. 1, 1985

[30] Foreign Application Priority Data

Jul. 2, 1984 [JP] Japan .................. 59-135154

[51] Int. Cl.$^4$ .............................................. H04N 5/782
[52] U.S. Cl. ..................................... 358/310; 358/327; 358/328; 360/10.2; 360/77
[58] Field of Search .......................... 360/77, 78, 10.2; 358/310, 328, 327; 369/43

[56] References Cited

U.S. PATENT DOCUMENTS 4,167,763  9/1979  Kubota .................................. 360/77
4,549,226  10/1985  Tomita ................................. 358/328

OTHER PUBLICATIONS

Electronics p. 100, Mar. 22, 1965.

Primary Examiner—Robert L. Richardson
Attorney, Agent, or Firm—Birch, Stewart, Kolasch & Birch

[57] ABSTRACT

Apparatus for playing back a rotary magnetic recording medium has a magnetic head for sensing color video signals provided by raster scanning out of a plurality of tracks, each of which is provided on the recording medium in such a locus that a beginning and an end of recording thereof coincides with each other in relative position, a head transport mechanism for transporting the head to a desired one of the tracks, a controller for performing tracking by controlling the head transport mechanism responsive to video signals which are sensed by the head out of the recording medium, and a video signal processing circuit made up a luminance signal processing circuit and a chrominance signal processing circuit for producing color video signals sensed out by the head in the form of standard color television signals. The controller normally prevents the chrominance signal processing circuit from superposing a color burst on a video signal during at least a part of a vertical blanking period in the raster scanning, and allows the chrominance signal processing circuit to superpose a color burst on a video signal during the tracking control.

5 Claims, 14 Drawing Figures

Fig. 1

| Fig. 1A | Fig. 1B |

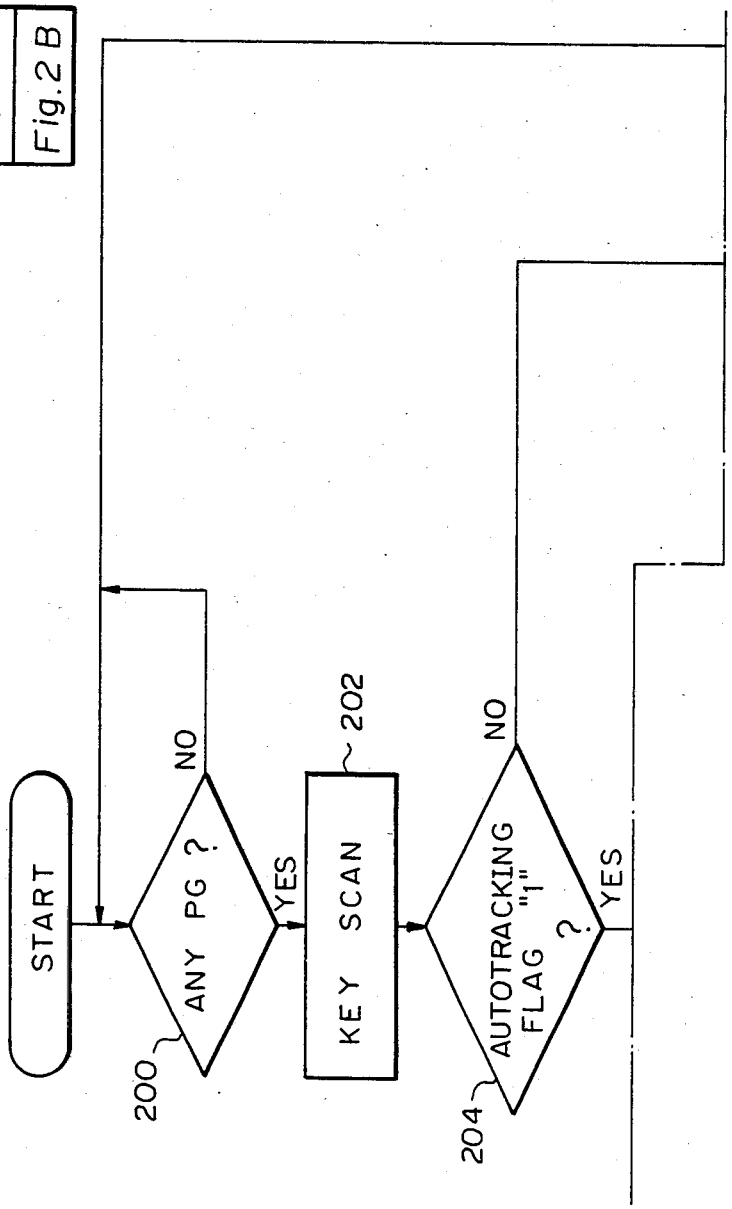

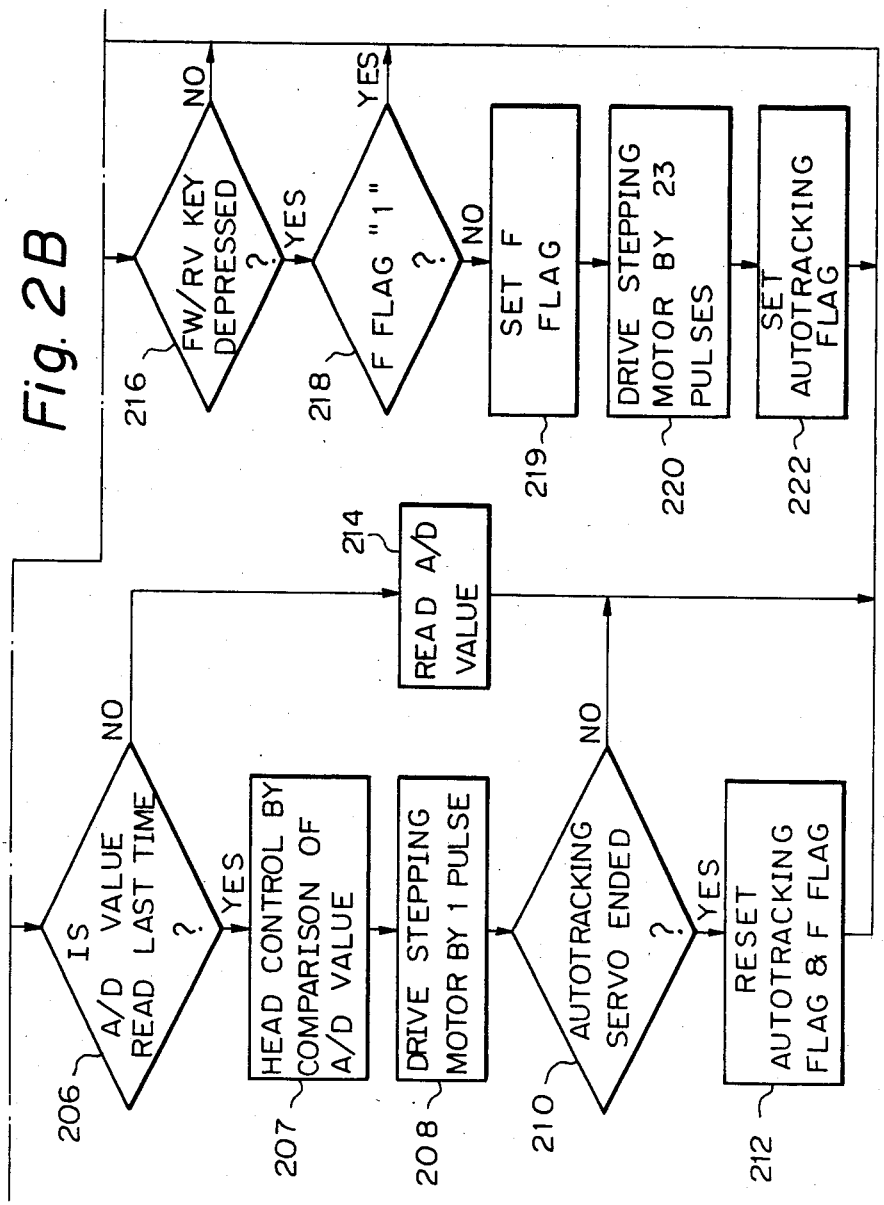

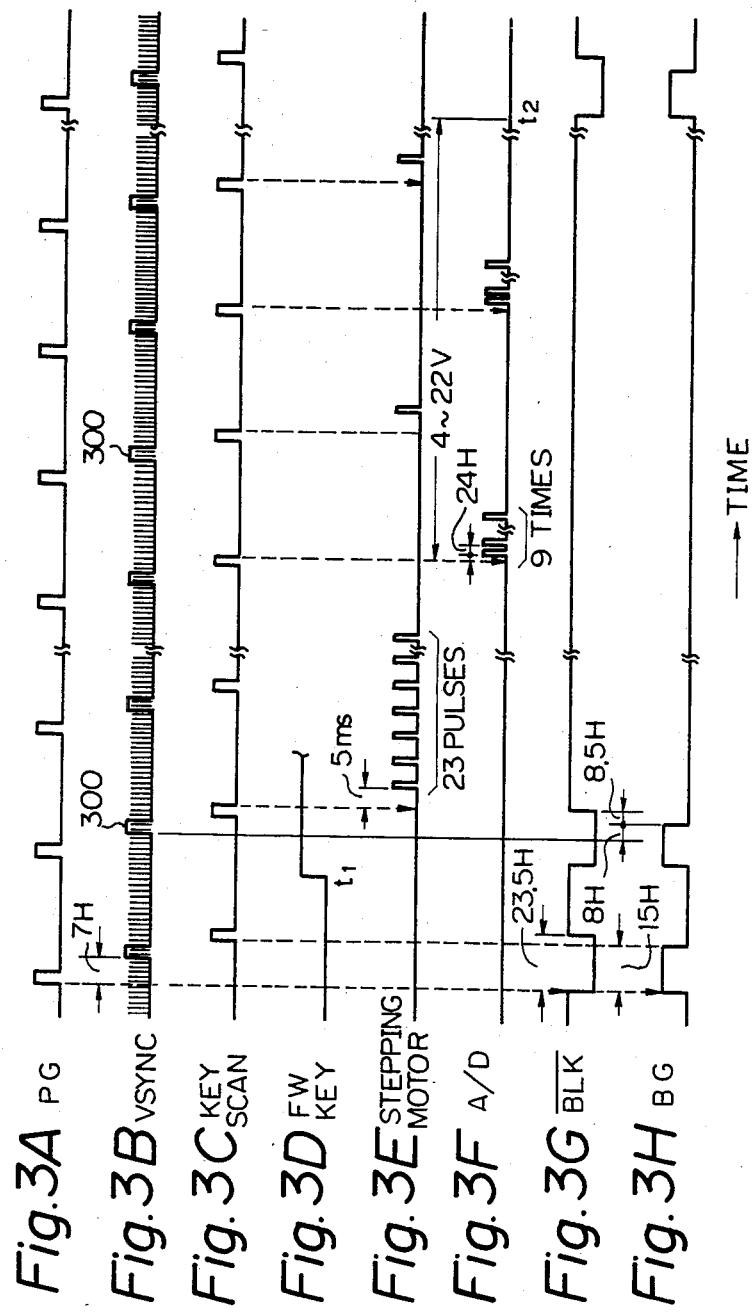

TRACKING APPARATUS FOR PLAYING BACK ROTARY MAGNETIC RECORDING MEDIUM

BACKGROUND OF THE INVENTION

1. Field of the Invention

The present invention relates to apparatus for playing back a rotary magnetic recording medium and, more particularly, to a playback apparatus for reproducing information out of a rotary magnetic recording medium, such as a magnetic disk, magnetic drum, while effecting tracking servo. Still more particularly, the present invention is concerned with a playback apparatus of the type which reproduces information out of concentric tracks provided on a magnetic disk while effecting tracking servo.

2. Description of the Prior Art

One of the achievements in the realm of modern imaging art is an electronic still camera system which uses a combination of an imaging device such as a solid state imaging device or an image pickup tube and a recording unit using a magnetic disk, which is a relatively inexpensive and large-capacity recording medium. In this system, an image is taken purely electronically in the form of electrical signals representative of a still picture to be recorded on a magnetic disk while the disk is rotated. The picture may be reproduced in the form of a soft copy using a television system or in the form of a hard copy using a printer by way of example.

A problem with recording media, particularly magnetic disks, applicable to magnetic recording of the kind stated is that their anisotropy, eccentricity, thermal expansion and other undesirable factors are apt to result in tracking error. During reproduction, tracking error often causes a track next to a desired track to be scanned simultaneously with the desired one and, thereby, brings about crosstalk between video signals stored in the nearby tracks.

One approach heretofore proposed to solve the above problem is a system which records a tracking signal together with information in a recording medium under application of tracking servo and, in the event of reproduction, effects tracking servo utilizing the tracking signal. However, it is impractical to install in a small-size light-weight recording apparatus such as a camera a tracking servo mechanism which requires accurate control.

In light of the above, a guard band system or a frequency modulation (FM) azimuth system may be used for a recording scheme. The guard band of FM azimuth recording scheme is successful in preventing a playback head from scanning a track adjacent to a desired one or, if scanned, from picking up a signal from the adjacent track, thereby compensating for some degrees of tracking error during reproduction.

Another known approach is a so-called envelope peak detecting autotracking control system. The principle of this system is such that during recording a record head is transported by a stepping motor at predetermined track pitches without effecting tracking servo and, during playback, an envelope of signals read out of each track is detected so as to identify an optimum track based on the peak of the envelope, thereby effecting tracking servo.

As described above, in an envelope peak detecting autotracking system, tracking control occurs on the basis of envelope levels of signals recorded in a recording medium. When a magnetic head is located at or near the positive peak of envelope levels, it is determined to be in an optimum tracking position. Whether or not the head has reached a peak or near-peak position is determined by comparing envelope levels at at least two nearby head positions so as to see whether or not they have no substantial difference.

A rotary magnetic recording medium is usually provided with a plurality of tracks at predetermined intervals. A rotary magnetic recording medium for use with an electronic still camera system, for example, may comprise a disk which is as small as about 50 millimeters in diameter and provided with fifty tracks at track pitches of about 100 microns, i.e. tracks each being 50–60 microns wide and guard bands each being 50–40 microns wide. In a playback unit, such a disk is rotated at a constant speed of, for example, 3,600 revolutions per minute so that video signals are reproduced at a field or frame rate.

For accurate tracking, it is advantageous to detect envelope levels at several positions, which the head encounters while transported in the radial direction of the disk, compare the detected envelope levels, and repeat such a procedure. A system preferable from the standpoint of practical use of the device is, for example, one which does not mute video signals and, instead, allows images to be reproduced on a video monitor while a playback head is transported from one track to another, or one which mutes video signals but cancels the muting mode during autotracking control, which occurs after a playback head has become on-track, so as to allow images to appear on a video monitor.

However, it has been found that performing ordinary color signal processing when a mute mode is cancelled at least upon the start of autotracking servo in order to produce images on a video monitor during the mute cancellation period gives rise to a problem as follows. Usually, a color signal processing circuit is inhibited from superposing a color burst on the back porch of a composite television signal in at least a part of horizontal blanking periods in a vertical blanking period in the raster scanning. Should such processing be performed even during autotracking servo, color signal processing would fail to build up to a sufficient degree and, thereby, disturb colors in reproduced pictures.

SUMMARY OF THE INVENTION

It is therefore an object of the present invention to provide apparatus for playing back a rotary magnetic recording medium which minimizes disturbance to colors occurring after the completion of tracking servo associated with the recording medium.

Apparatus for playing back a rotary magnetic recording medium in accordance with the present invention has magnetic head means for sensing color video signals provided by raster scanning out of a plurality of tracks, each of which is provided on the recording medium in such a locus that a beginning and an end of recording thereof coincides with each other in relative position, head transport means for transporting the head means to a desired one of the tracks, controller means for performing tracking by controlling the head transport means responsive to video signals which are sensed by the head means out of the recording medium, and a video signal processing circuit including a luminance signal processing circuit and a chrominance signal processing circuit for producing color video signals sensed out by the head means in the form of standard color television signals. The controller means normally prevents the chrominance signal processing circuit from superposing a color burst on a video signal during at least a part of vertical blanking period in the raster scanning, and allows the chrominance signal processing circuit to superpose a color burst on a video signal during the tracking control.

It should be born in mind that the words "a plurality of tracks each being provided in such a locus that the beginning and end of recording coincide in relative position" which will appear herein imply those tracks which are each provided without changing the position of a record head relative to a rotary magnetic recording medium. Such tracks may be typified by a number of tracks on a magnetic disk which are concentric with respect to the axis of rotation of the disk, or a number of circumferentially extending tracks on a magnetic drum which are parallel to each other along the axis of the drum.

BRIEF DESCRIPTION OF THE DRAWINGS

The objects and features of the present invention will become more apparent from a consideration of the following detailed description taken in conjunction with the accompanying drawings in which:

FIGS. 2A and 2B, when combined as shown in FIG. 2, are flowcharts exemplarily representative of the operation of a controller included in the playback apparatus of FIGS. 1A and 1B; and FIGS. 3A-3H are timing charts also useful for understanding the operation of the controller.

DESCRIPTION OF THE PREFERRED EMBODIMENT

Figure 1A:
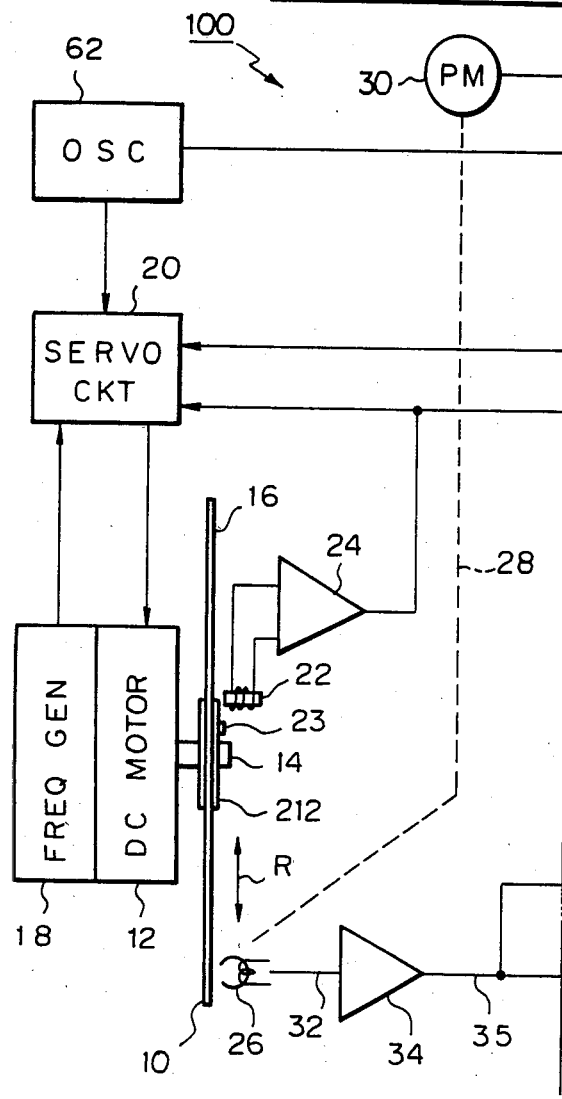
FIGS. 1A and 1B, when combined as shown in FIG. 1, are schematic block diagrams of a playback apparatus for use with a rotary magnetic recording medium embodying the present invention.
Figure 1B:
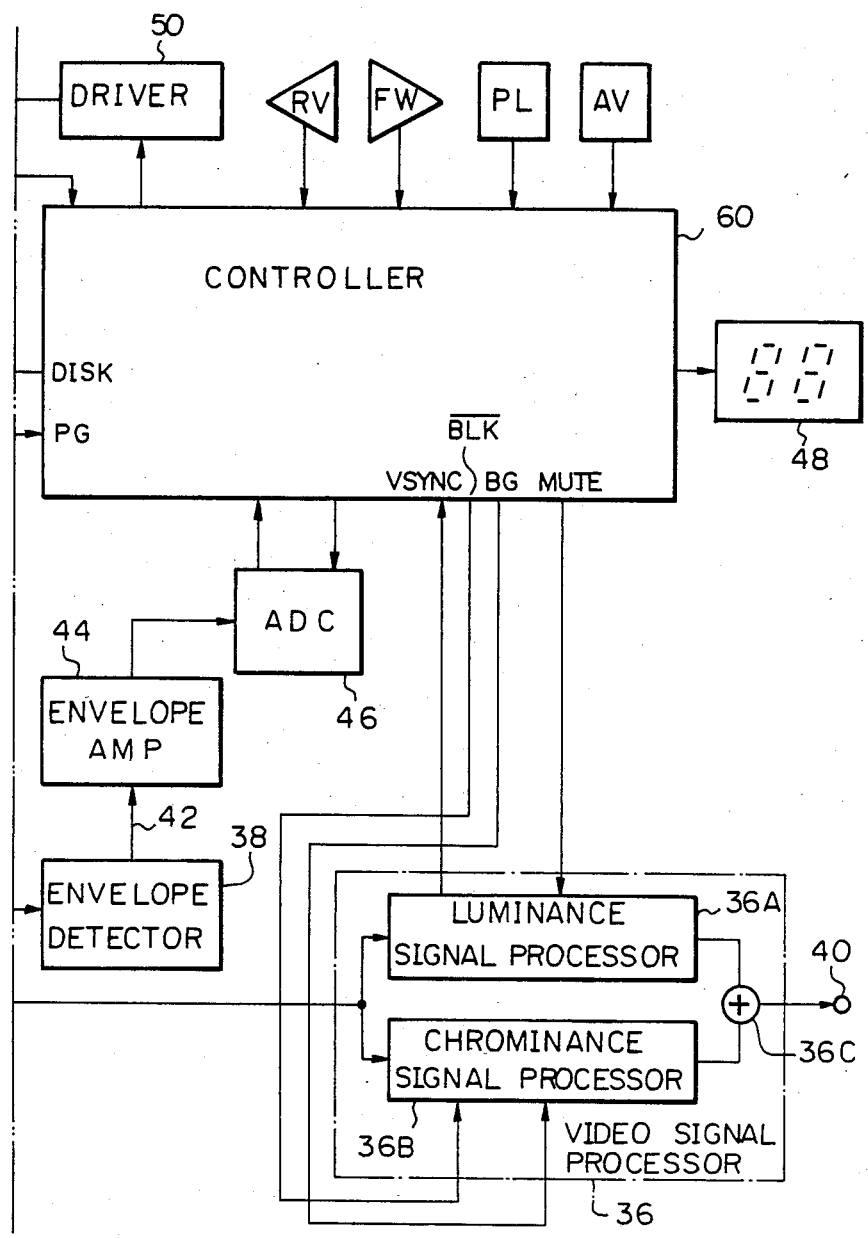

Referring to FIGS. 1A and 1B of the drawings, a playback apparatus in accordance with the present invention is shown and generally designated by the reference numeral 100. As shown, the playback apparatus 100 includes a dc motor 12 and a spindle 14 which is driven by the dc motor 12. A rotary recording medium such as a magnetic disk 10 is removably loaded on the spindle 14. In this particular embodiment, the recording medium 10 comprises a magnetic disk having a sheet of magnetic recording material, which is about 50 millimeters in diameter, and accommodating, for example, fifty concentric tracks on its recording surface 16 at the pitches of, for example, about 100 microns. Signals which may be recorded in the tracks on the disk 10 are, in the illustrative embodiment, video signals as exemplified by color video signals whose luminance, chrominance and synchronizing signals are FM modulated. The video signals may be recorded on the tracks by raster scanning such that a field video signal which constitutes one complete field of picture is assigned to one track.

The dc motor 12 is provided with a frequency generator 18 adapted to generate an ac frequency signal. Powered by a servo circuit 20, the dc motor 12 is servo-controlled to drive the disk 10 at a predetermined constant speed such as 3,600 revolutions per minute. A control unit, or controller, 60 which governs the operation of the whole apparatus is interconnected to the servo circuit 20 so that the latter controls the start and stop of rotation of the disk 10 responsive to a signal DISK.

A phase generator 22 is located in a predetermined position adjacent to the recording surface 16 of the disk 10 and interconnected via an amplifier 24 to the servo circuit 20 and the controller 60. Every time the phase generator 22 senses a timing mark 23 which is provided in a predetermined position on a core 212, it generates a timing pulse PG.

Disposed above the recording surface 16 of the disk 10 is a magnetic head, or transducer, 26 which is supported by a support mechanism 28. As schematically represented by the phantom line in the drawing, the support mechanism 28 is driven by a stepping motor (PM) 30 to move the head 26 radially along the recording surface 16 in any of opposite directions as indicated by a double-headed arrow R, so that a desired track on the recording surface 16 may be selected.

While the head 26 may be of the type having a magnetic recording function, it in the illustrative embodiment serves the playback function, that is, it senses a video signal out of a track provided on the recording surface 16 and then transforms it into an associated electric signal. Since the disk 10 in this particular embodiment rotates at a constant speed of 3,600 revolutions per minute as earlier described, one track of video signal, or one field of FM modulated video signal, is reproduced by the head 26 for each full rotation of the disk 10, or 1/60 second. The reproduced video signal is demodulated in a format which is compatible with a standard color television format such as the NTSC (National Television System Committee).

The disk 10 which is advantageously applicable to the illustrative embodiment of the present invention is of the kind in which a video signal is recorded by a recording apparatus such that a vertical sync signal VSYNC appears with a phase delay of a predetermined period of time, such as 7Hs (horizontal scanning periods), with respect to the timing mark which is adapted for the generation of timing pulses PG.

The output 32 of the head 26 is routed through a preamplifier 34 to a video signal processing circuit 36 and an envelope detection circuit 38. The video signal processing circuit, or processor 36, processes a video signal sensed by the head 26 and then applies the processed video signal to an output terminal 40 of the apparatus in the form of, for example, an NTSC format composite color video signal. In detail, the video signal processor 36 comprises a luminance signal processing circuit 36A, a chrominance signal processing circuit 36B, and a mixer 36C for combining outputs of the two circuits 36A and 36B. The luminance signal processor 36A serves to bring luminance components and sync signal components of modulated video signals, which are sensed by the head 26, into conformity with the NTSC format. Likewise, the chrominance signal processor 36B serves to demodulate color signal components of the modulated video signals, and to perform balanced modulation and superposition of color bursts to format the demodulated color signal components in the NTSC format. Combined by the mixer 36C, the luminance and chrominance signals output from the processors 36A and 36B are fed to an output terminal 40 of the apparatus in the form of an NTSC format composite color video signal. The video signal processor 36 has a function of separating vertical sync signals VSYNC from the NTSC format composite color video signal to apply the separated signals VSYNC to the controller 60. Another function assigned to the processor 36 is muting, or blanking out, the video signals over an effective horizontal scanning period in response to a signal MUTE supplied from the controller 60. Meanwhile, the controller 60 applies a vertical blanking signal $\overline{BLK}$ and a color burst gate signal BG to the color signal processor 36B of the video signal processor 36 in order to selectively inhibit it from superposing color bursts on the NTSC format composite color video signals.

The envelope detection circuit, or detector, 38 serves to detect the envelope of FM modulated video signals stored in each track on the recording surface 16 and then develop at its output 42 a voltage complementary to the detected envelope. The output 42 of the envelope detector 38 is interconnected to an analog-to-digital converter (ADC) 46 by way of an envelope amplifier 44. In this particular embodiment, the ADC 46 has 256 quantizing levels, any one of which is produced in the form of eight-bit data to the controller 60 in response to a request from the latter.

As described later in detail, the controller 60 supervises the operations of the whole apparatus as instructed by operator's manipulation and may advantageously be implemented by a microprocessor system.

In the illustrative embodiment, there are provided a play key PL for activating and deactivating the apparatus, a forward key FW for causing the head 26 to be transported forwardly with respect to serial numbers which are assigned to the tracks (e.g. from the outermost track to the innermost track), and a reverse key RV for causing the reverse direction transportation of head 26. These keys PL, FW and RV are interconnected to the controller 60. A number designated by the key FW or RV appears on a display 48 which is interconnected to the controller 60 and may comprise light emitting diodes or a CRT display, for example. The display 48 may also be furnished with a function of producing audible alarms and others, if desired.

The stepping motor 30 in this particular embodiment comprises a four-phase drive pulse-operated motor which rotates about 18 degrees responsive to one drive pulse and, therefore, 360 degrees responsive to twenty pulses in total. The head support structure 28 is constructed to transport the head 26 about 4.2 microns in one of the directions R responsive to one pulse applied to the stepping motor 30, that is, to move the head 26 about 100 microns in response to twenty-four consecutive pulses.

The drive pulses are applied to the stepping motor 30 from a driver 50 which comprises a current amplifier. The driver 50 generates pulses for driving coil windings of the stepping motor 30 according to a particular drive pattern which is specified by the controller 60.

The controller 60 and servo circuit 20 respond each to a reference clock which is generated by a reference generator (OSC) 62. In the illustrative embodiment, the servo circuit 20 is supplied with a 60 Hz reference signal which is equal to the field frequency of video signals to be recorded in the disk 10 by raster scanning, while the controller 60 is supplied with a high-frequency clock such as a 3.58 MHz clock.

Referring to FIGS. 2A and 2B, flowcharts demonstrating an example of transportation of the head 26 over th the tracks and of tracking control which are executed by the controller 60 is shown. The reference for the operation shown in FIGS. 2A and 2B is provided by a key scan signal, FIG. 3C.

In an initial stage of operation of the reproducting apparatus 100, the key scan signal is generated at intervals, which may advantageously be 1/59 second, which is slightly longer than 1/60 second of the vertical scanning period and formed by counting the reference clock which is applied from the reference oscillator 62 to the controller 60, i.e. 1 V (vertical scanning period). However, as the system is stabilized after the activation of the apparatus 100, the key scan signal is generated at a predetermining timing based on the previously mentioned signal PG.

When the disk 10 begins to rotate driven by the dc motor 12, the phase generator 22 generates a phase generator signal, or pulse, PG every time the timing mark on the core 212 moves past the phase generator 22, the signal PG being routed to the controller 60 and the servo circuit 20. The signal PG is shown in FIG. 3A as being in a substantially stabilized condition. In the case of the disk 10 which has stored one field of video signal on one track, the period of the signal PG is 1 V.

As the system reaches a steady condition, the controller 60 generates a vertical blanking signal $\overline{BLK}$ as shown in FIG. 3G and a color burst gate signal BG as shown in FIG. 3H each at a predetermined timing which is based on the signal PG. The signals $\overline{BLK}$ and BG are delivered to the video signal processor 36.

As soon as the head 26 which is driven by the stepping motor 30 through the mechanism 28 is brought to a position over a certain track on the disk 10, it picks up video signals as shown in FIG. 3B. The video signals stored in the disk 10 contain vertical sync signals VSYNC 300 at periods of 1 V. The video signals have been recorded such that in a steady condition each vertical sync signal VSYNC 300 is delayed in phase by about 7 Hs relative to the signal PG.

The operation flow shown in FIG. 2 is triggered responsive to a signal PG. So long as the condition remains stable, the signals PG appears at every period of 1 V and, hence, the illustrated flow is triggered in each 1 V. Upon generation of a signal PG, the controller 60 produces a key scan signal (step 202, and FIG. 3C). If an envelope peak detecting autotracking flag which will be described is not set then (204), the controller 60 scans the respective keys (216) to check their statuses.

Assuming that the FW key is depressed at a time $t_1$ while the head 26 is located over a certain track, such a state is drawn into the controller 60 timed to a key scan signal which appears for the first time after the time $t_1$. In the illustrative embodiment, since an F flag which will appear later has not yet been set (218), the controller 60 sets it (219) and then causes the driver 50 to drive the stepping motor 30 forwardly by twenty-three pulses. As a result, the head 26 is transported about 96 microns (220). By the about 96 microns transportation, the head 26 is moved forwardly from one track to another which is next to that track so that, in a normal condition, it will become on-track to detect an envelope value which is higher than a predetermined value. The same events will naturally occur but in the opposite sequence if the key RV has been depressed. This manner of drive proceeds at a timing as shown in FIG. 3E.

When the transportation is completed, the head 26, if the condition is normal, will have been settled over the adjacent track and, therefore, the controller 60 sets the autotracking flag (222). The F flag previously mentioned shows that the key FW or RV has been depressed to cause a tracking control associated therewith.

After the transportation, the controller 60 responds to a signal PG by producing a key scan signal (202) and, because the autotracking flag has already been set (204), the flow advances to a decision box 206. Since the controller 60 has not read a digital version of the analog video signal from the ADC 46 last time, it reads a digital output of the ADC 46 this time (214).

As previously mentioned, a digital output of the ADC 46 represents the envelope of video signals stored in a track of the disk 10. In this particular embodiment, as shown in FIG. 3F, an envelope is read, or sampled, a plurality of times such as nine times for each head position, and a weighted mean value of the sampled values is used as an envelope level at that head position. This eliminates mistracking due to scattering of envelope levels which might result from eccentricity of the disk 10 or other causes.

Upon generation of another signal PG, the control advances to a decision box 206 responsive to the resulting key scan signal. This time, since the controller 60 has read a digital output of the ADC 46, it performs a step 208 by way of a step 207 so that the stepping motor 30 is driven by another pulse in a direction which has been controlled at the step 207.

At the step 207, the controller 60 compares the two envelope levels which it read in consecutively and, then, designates a subroutine programed for the control over the direction of movement of the head 26. The operation at the step 207 will not be described in detail. Briefly, when an envelope level higher than a predetermined value is not detected at a head position which has been reached upon transportation of the head 26 from one track to the next, the controller 60 regards that track non-recorded and in turn searches another track next to that track. If no envelope level higher than the predetermined value has been detected at the two consecutive tracks, the controller 60 returns the head 26 to the last recorded track. Meanwhile, when any significant difference has been found between the two envelope levels, the controller 60 controls the movement of the head 26 such that the latter moves toward a position where the envelope level is higher. As soon as the significant difference between two envelope levels becomes zero, the controller 60 moves the head 26 a multiplicity of times while changing the direction of movement so as to confirm that no significant difference develops between the discrete envelope values and, then, the controller 60 ends the autotracking servo.

Referring again to FIG. 2, if the autotracking servo has not yet been ended, that is, if the head 26 has not yet been settled at a position at or near the peak of the envelope levels (210), the controller 60 repeatedly executes the loop made up of the steps 200, 202, 204, 206 and 214 and the loop made up of the steps 200, 202, 204, 206, 207, 208 and 210, i.e. repeatedly reading the digital output of the ADC 46 and transporting the head 26 by one pulse each time. The controller 60 in this manner continues with the autotracking control by comparing the envelope levels.

As the system is converged by the above sequence of events, the controller 60 ends the autotracking control (210) to reset the autotracking flag and F flag (212) to prepare for the next keying.

When the head 26 has been settled exactly on a desired track, video signals in an adequate condition are delivered from the head 26 to the video signal processor 36, FIG. 3B. It follows that the processor 36 is operated referencing vertical sync pulses 300 or other sync signals which are contained in the video signals.

As described above, in this particular embodiment, the time reference for the operation of the controller 60 is provided by the key scan signals. Before the timing signals PG appear steadily, the key scan signals are produced based on the reference clock which is produced from the reference generator 62 and, after steady generation of the signals PG is set up, based on the signals PG. It will thus be seen that the reference for the head transportation and envelope detection with respect to timing is provided not by the sync signals contained in video signals but by the signals PG output from the phase generator 22.

Therefore, reference signals essential for the operation of the apparatus are surely provided even when the head 26 is in transportation from the home position toward the first track, when it is above a track which stores no signals, or when sync signals expected to exist in video signals have dropped out. Such effectively promotes movement of the head 26 between discrete tracks as well as tracking control.

As shown in FIG. 1 and as already mentioned, the controller 60 applies a vertical blanking signal $\overline{BLK}$ and a color burst gate signal BG to the color signal processor 36B which is included in the video signal processor 36. The signals $\overline{BLK}$ and BG build up and fall at the timings shown in FIGS. 3G and 3H, respectively. Low levels of the signals $\overline{BLK}$ show the processor 36B the timing of vertical blanking periods. The signal BG prevents the processor 36B from superposing color bursts on video signals when high level and allows it to superpose color bursts on video signals when low level.

In the illustrative embodiment, during a usual playback period in which the head 26 traces a desired track (i.e. playback period other than a period during which tracking control is under way), the controller 60 performs ordinary processing in which the vertical blanking signal $\overline{BLK}$ is turned to low level only for a vertical blanking period, as shown in FIGS. 3G and 3H, to show the processor 36B the vertical blanking period, and the processor 36B is inhibited from superposing a color burst on a video signal for at least a part of the vertical blanking period. On the other hand, while the head 26 is transported, the controller 60 maintains the signal $\overline{BLK}$ high level and the signal BG low level, as shown in the same drawings. Specifically, the controller 60 maintains the signal BG low level while the F flag remains set as shown in FIG. 2, that is, during the period between a key scan just after the time $t_1$ shown in FIG. 3 and a key scan at the time $t_2$.

The processor 36B superposes color bursts on the video signals during the above-mentioned period of time responsive to the signal BG. As a result, video signals applied from the processor 36 to the output terminal 40 during that period have color bursts superposed thereon even in a vertical blanking period. Hence, where use is made of a video monitor for reproducing the video signals, the video monitor will rapidly pick up the color signals and, thereby, allow a minimum of color disturbance to occur in the reproduced picture.

In summary, it will be seen that the present invention provides a playback apparatus for use with a rotary magnetic recording medium which superposes color bursts on video signals even during vertical blanking periods while a magnetic head is in tracking, so that the disturbance to color of a picture reproduced on a video monitor is minimized.

Various modifications will become possible for those skilled in the art after receiving the teachings of the present disclosure without departing from the scope thereof.

What is claimed is:

1. Apparatus for playing back a rotary magnetic recording medium comprising:
   magnetic head means for detecting color video signals, provided by raster scanning, from a plurality of tracks, each of which is provided on the recording medium in a substantially closed loop;
   head transport means for transporting the head means to a desired one of the tracks;
   control means for performing tracking by controlling the head transport means responsive to video signals in the recording medium which are detected by the head means; and
   a video signal processing circuit including a luminance signal processing circuit and a chrominance signal processing circuit for producing color video signals detected by the head means in the form of standard color television signals;
   the control means normally preventing the chrominance signal processing circuit from superposing a color burst on a video signal during at least a part of a vertical blanking period in the raster scanning and allowing the chrominance signal processing circuit to superpose a color burst on a video signal during the tracking control.

2. A playback apparatus in accordance with claim 1, further comprising sync signal producing means for producing a reference signal which is synchronous to rotation of the recording medium, said control means responding to the reference signal.

3. A playback apparatus in accordance with claim 2, wherein the recording medium is provided with a timing mark, said sync signal producing means producing the reference signal upon sensing the timing mark.

4. A playback apparatus in accordance with claim 1, wherein said rotary recording medium is a magnetic recording disk having a track on which recorded is a field of the video signals including luminance, chrominance and synchronizing signals formed in a raster scanning fashion.

5. A playback apparatus in accordance with claim 4, wherein the video signals are recorded on the disk in frequency modulation, said signal processing circuit demodulating the video signals to produce the same in the form of standard color television signals.

* * * * *